Patented Mar. 24, 1942

2,277,479

UNITED STATES PATENT OFFICE 2,277,479

ACETOACETIC ESTER-FORMALDEHYDE RESINS

Gaetano F. D'Alelio, Pittsfield, Mass., assignor to General Electric Company, a corporation of New York No Drawing. Application August 13, 1938, Serial No. 224,799

1 Claim. (Cl. 260—67)

The present invention relates to resinous compositions and to the production of the same.

This application is a continuation-in-part of my copending applications, Serial No. 169,465, filed October 16, 1937, now Patent No. 2,239,440, issued April 22, 1941, and Serial No. 205,007, filed April 29, 1938, both applications being assigned to the same assignee as the present invention.

This invention is based on the discovery that ethylene compounds in which both bonds of the beta carbon atoms of the ethylene molecule are attached to two carbon atoms which are at least double bonded, are very active polymerizing substances.

More particularly, the grouping of the class of substances falling within the scope of the present invention may be represented, generally, as

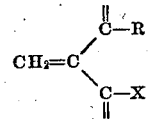

where R is a radical selected from the class consisting of alkyl (e. g., —CH₃, —C₂H₅), aralkyl (e. g., —CH₂C₆H₅), aryl (e. g. —C₆H₅) and alkaryl (e. g., —C₆H₄CH₃), and X is a radical selected from the class consisting of R' and OR', where R' has the same meaning as R. R and R' may be the same or different radicals selected from the defined class. As noted, the carbon atoms adjacent to the beta carbon atom are at least double bonded and may be attached to a double bonded element such as oxygen or sulfur, or a double bonded radical such as the imine group (=NH).

Illustrative examples of some compounds falling within the class of substances mentioned are methylene ethyl acetoacetate,

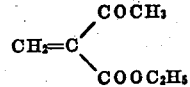

and methylene acetyl acetone,

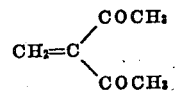

Methylene ethyl acetoacetate and methylene acetyl acetone are examples of organic compounds which may be represented by the graphic formula

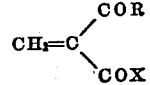

where R and X have the meanings given above. More particularly methylene ethyl acetoacetate is an example of an organic compound which may be represented by the graphic formula

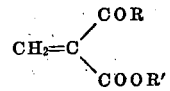

and methylene acetyl acetone is an example of an organic compound which may be represented by the graphic formula

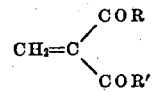

where R and R' are the same or different radicals of the above-mentioned class.

While it is possible to prepare the methylene derivatives of this invention by other methods, I prefer, as disclosed in my above-noted copending applications, to prepare the group of compounds described herein through a reaction between an aldehyde, such as, formaldehyde and an organic compound containing a —CH₂— group adjacent to two carbon atoms which are at least double bonded. One of these double-bonded carbon atoms is connected to a radical represented in the above formulas by R and the other to a radical designated in the above formulas as X(R' or OR'). In other words, formaldehyde is caused to react with an organic compound having the graphic formula

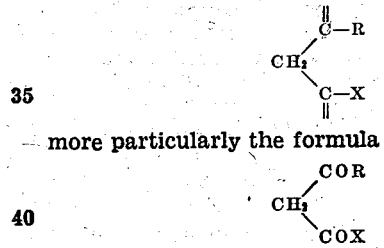

more particularly the formula where R and X have the meanings above given with particular reference to the formulas for the corresponding methylene derivatives. For example, an aqueous solution of formaldehyde may be reacted, as hereafter more fully described, with organic compounds having the graphic formulas

and

to form the corresponding methylene derivatives

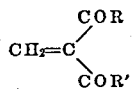

and

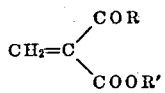

where R and R' have the meanings above given.

As an example of the reaction I may use formaldehyde and ethyl acetoacetate. A methylol derivative first forms, and this is dehydrated to the methylene compound, followed by polymerization. Low molecular weight products in the form of a light yellow oil may be obtained during this process. On further heating water may be eliminated by an intermolecular reaction between the —CH₃ group of one molecule and the =C=O of another molecule to give higher resinous complexes. These side reactions would not occur if a non-reactive radical such as a benzoyl replaced the acetyl of acetoacetic ester to give methylene benzoyl acetic ester by reaction with formaldehyde

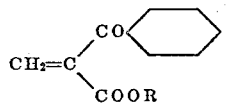

Methylene acetyl acetone likewise may be prepared from acetyl acetone and formaldehyde. In this case intermolecular reactions also occur which would be avoided if a ketone such as malonyl diphenyl ketone,

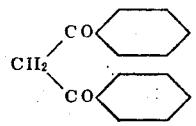

were condensed with formaldehyde to give the methylene derivative,

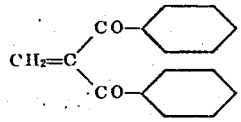

The condensation between formaldehyde and an organic compound of the kind with which this invention is concerned will proceed under acid or alkaline conditions, though alkaline conditions are preferred. The alkali used in the condensation, such as sodium hydroxide, sodium carbonate, morpholine or the like may be neutralized before the isolation of the resinous bodies.

It may be advisable in some instances to carry out the reactions in the presence of polymerization inhibitors, e. g. hydroquinone, and the dehydration may be assisted by dehydration agents such as phosphoric acid, etc.

Although an amount of formaldehyde in excess, as well as in a quantity insufficient to react with these compounds containing an active —CH₂— group in molecular equivalents may be used, it is preferable to use at least an equivalent mol ratio; yet an excess actually is used in quantities so adjusted as to keep the formation of methylene bis derivatives, which are formed as by-products, at a minimum.

The condensation of formaldehyde with organic compounds containing an active —CH₂— group may be carried out at any temperature from room temperature up to the reflux temperature of the aldehyde. Pressure may be used to obtain temperatures higher than the reflux temperature of formaldehyde.

The water in the reaction product may be removed by dehydration under reduced or atmospheric pressures either at high or low temperatures.

*Example 1*

10 parts (0.1 mol) of acetyl acetone
8.9 parts of 37.1% formalin solution (0.11 mol HCHO)
0.1 part (0.0025 mol) of sodium hydroxide in 10 parts of water were refluxed for 90 minutes. The original acetyl acetone was yellow in color and the condensation product was of the same shade. During the reaction the solution was homogeneous and on cooling a separation into two phases occurred. The water was removed either by distillation at atmospheric pressure which left a dark colored resin when cooled, or by dehydration at 70° C. followed by heating at 160° C.

In the above formula the mol ratios of components are approximately as follows:

|  | Mols |
|---|---|
| Acetyl acetone | 1. |
| Formaldehyde | 1.1 |
| Sodium hydroxide | 0.025 |

*Example 2*

26 parts (0.2 mol) of ethyl acetoacetate
18 parts of 37.1% formalin solution (0.222 mol HCHO), and
0.26 part of morpholine were refluxed for 90 minutes. The solution was originally homogeneous and on reflux an insoluble phase was formed. It was possible to remove water at 70° C., leaving a viscous resin insoluble in water but soluble in alcohol. On further heating at about 160° C. a very insoluble resin resulted. In the above formula the mol ratios of ethyl acetoacetate and formaldehyde are approximately as follows:

|  | Mols |
|---|---|
| Ethyl acetoacetate | 1 |
| Formaldehyde | 1.11 |

*Example 3*

26 parts (0.2 mol) of acetoacetic ester, specifically ethyl acetoacetate
36 parts of 37.1% formalin solution (0.445 mol HCHO)
0.3 part (0.0075 mol) of sodium hydroxide)

in 10 parts of water were added together and refluxed for two hours. The water was then removed by distillation, which left a brownish red resin that was thermoplastic and insoluble in water and alcohol. In the above formula the mol ratios of components are approximately as follows:

|  | Mols |
|---|---|
| Ethyl acetoacetate | 1 |
| Formaldehyde | More than 2 mols, specifically about 2.22 mols |
| Sodium hydroxide | 0.0375 |

*Example 4*

26 parts of acetoacetic ester, specifically ethyl acetoacetate
18 parts of formalin solution
0.3 part of sodium hydroxide in 10 parts of water were mixed and immediate reaction occurred with the liberation of heat. The mixture was let stand for 100 hours when 18 parts of formalin were again added and the whole solution let stand for 24 hours more. The water was distilled off and a brownish red resin insoluble in water and alcohol was obtained.

*Example 5*

13.2 parts of dimethyl malonate
8.9 parts of 37.1% formalin solution
0.1 part of sodium hydroxide in 5 parts of water were mixed, and resulted in a homogeneous solution with the evolution of heat. Water was removed by distillation (or evaporation) and on further heating to about 150° C. a thermoplastic resin similar to rosin was obtained.

*Example 6*

10 parts (0.1 mol) of acetyl acetone
26.7 parts of 37.1% formalin solution (0.33 mol HCHO), and
0.1 part (0.0025 mol) of sodium hydroxide in 10 parts of water were refluxed for three hours, the water was removed by evaporation at 70° C., and the product was heated to 160° C. Continued heating produced a plastic mass which is rubbery when hot and hard and brittle when cool. In the above formulas the mol ratios of components are approximately as follows:

| | Mols |
|---|---|
| Acetyl acetone | 1 |
| Formaldehyde | 3.3 |
| Sodium hydroxide | 0.025 |

*Example 7*

150 parts of formalin solution
160 parts of diethyl malonate
10 parts of morpholine were mixed in a flask and with stirring were allowed to stand for 12–24 hours. The product was then dehydrated under vacuum until about 150 parts of distillate were obtained and then discarded. The distillation was then continued as far as possible, usually at a vacuum of 10–15 mm. and with a bath temperature surrounding the flask of about 160–190° C. These fractions were kept for polymerization, which left a non-distillable residue in the flask whose softening point may be advanced by further heating. The collected distillate may be polymerized in the presence or absence of light, with or without peroxides or polymerization catalysts to low and high molecular weight polymers of glass-like clarity highly resistant to chemical action and to chemical solvents such as ethyl alcohol, ethyl acetate, concentrated alkali solutions and concentrated acid solutions. The separation of very low molecular weight products from high molecular weight products may be accomplished by specific solvents for the low molecular weight products such as ethyl alcohol, etc.

The low molecular weight polymers may be converted to polymers of higher molecular weight either by heating or by destructive distillation to monomers which are recondensed and repolymerized.

Hydroquinone may be added during different stages of the condensation, and zinc chloride or phosphoric acid may be added to assist the dehydration of the methylol derivative before or during the dehydration process.

From the foregoing description, more particularly from Example 2, it will be seen that the present invention provides a method of preparing a resinous composition which comprises refluxing under heat ethyl acetoacetate and an aqueous solution of formaldehyde in the ratio of one mol of the former to substantially more than one mol of the latter in the presence of morpholine as a catalyst, said morpholine being present in the ratio of about 1 part of morpholine to 100 parts of ethyl acetoacetate, heating the reaction mixture at about 70° C. to remove the water and then heating at about 160° C. until an insoluble resin results.

What I claim as new and desire to secure by Letters Patent of the United States is:

The method of preparing a resinous composition which comprises refluxing under heat ethyl acetoacetate and an aqueous solution of formaldehyde in the ratio of one mol of the former to substantially more than one mol of the latter in the presence of morpholine as a catalyst, said morpholine being present in the ratio of about 1 part of morpholine to 100 parts of ethyl acetoacetate, heating the reaction mixture at about 70° C. to remove the water and then heating at about 160° C. until an insoluble resin results.

GAETANO F. D'ALELIO.